United States Patent Office 2,928,546
Patented Mar. 15, 1960

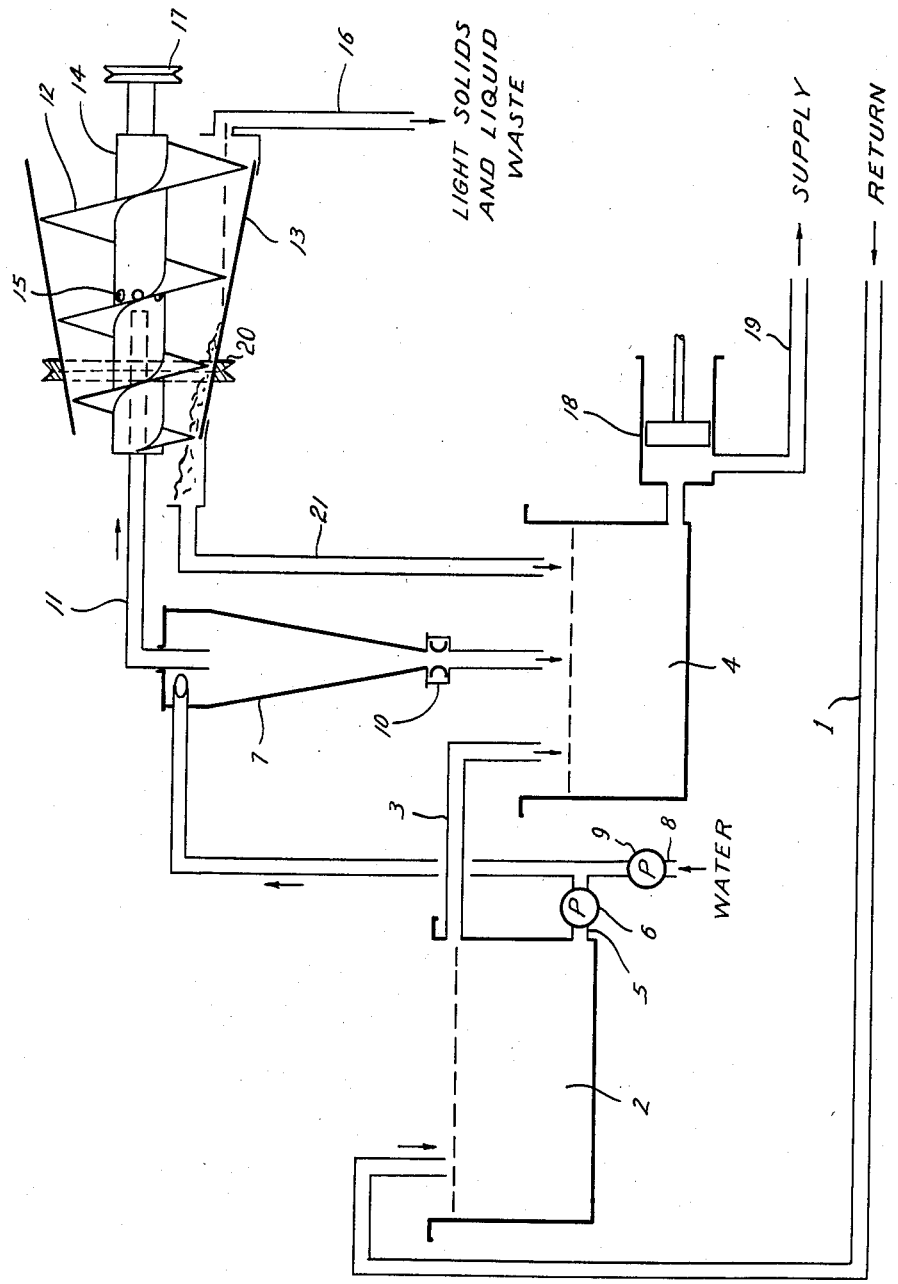

2,928,546
MUD SEPARATOR
Carroll E. Church, Houston, Tex.

Application August 29, 1955, Serial No. 531,222

1 Claim. (Cl. 210—319)

This invention relates to new and useful improvements in a mud separator.

It is an object of this invention to provide a mud separator for separation of certain heavy matter in a fluid in volume.

In oil well drilling, a mud is employed in the drilling operations, which is circulated through the bore of the well, and which picks up a quantity of light and undesirable solids in the course of circulation, which add volume to the mud but do not add the density desired and it is desirable to remove these light solids from the mud in order to reemploy the heavy solids and valuable additives. It is an object of this invention to provide an apparatus for recovery of said heavy solids by separation of the light and undesirable solids from the mud returned from the well.

It is often necessary to add heavy solids to a drilling mud while in the process of drilling in order to increase the density of the mud. Solids, as Barytes, which add to the expense of the drilling operation, are commonly used. It is still a further object of this invention to provide an apparatus for use in a method of treatment of drilling fluids from a well bore containing added heavy solids that will provide a maximum recovery of the valuable heavy solids in said fluid and eliminate drilling solids and other light solids and that will provide an increased volume of recovery as well as an increased efficiency and economy over the methods presently employed.

With the above and other objects in view, the invention relates to certain novel features of construction, operation and arrangement of parts more particularly defined in the following specifications and illustrated in the accompanying drawings, wherein:

The figure is a diagrammatic view of the combination of parts employed in carrying out the operation of the separation of solids in the fluid.

Referring now more particularly to the drawings, the numeral 1 designates a return line for conveying the fluid from a source of supply, such as a well bore, or a slush pit maintained for the storage of drilling mud, which line terminates in a storage tank 2. A line 3 leads from the top of said tank into the recovery tank 4, so that the drilling fluid may overflow into the recovery tank for reuse. A line 5 leads from the bottom of the tank 2 into a pump 6 and from the pump 6 into the vertical cone 7. A water line 8 leads into the line 5 between the pump 6 and cone 7 and a pump 9 assists the pump 6 in moving the contents of the tank 2 and the water mixed therewith under pressure into the cone 7. The line 5 enters the cone 7 tangentially, and the swirling action of the water and contents of the tank 2 causes the large particles to be moved to the outside and to drop through the lower end of the cone 7 into the recovery tank 4 and the heavier solids in the fluid will be forced to the outside of the swirling fluid and will move downwardly along the walls of the cone 7 and out through the discharge end thereof into the recovery tank 4. A variable orifice valve, as 10, may be provided adjacent the discharge end of the cone 7 to control the discharge action.

Leading from the top of the cone 7 is the line 11, which leads into the hub 14 of the helical screw 12 in the housing 13 of a centrifugal separator. The hub 14 has suitable outlet ports as 15 approximately midway of the length thereof through which the fluid from the cone 7 passes into the housing 13. The housing 13 is also cone shaped, having a fluid chamber at the largest end thereof and having outlet ports and discharge lines, as 16, leading therefrom.

The screw 12 is rotated by means of the pulley 17 which may be rotated by any suitable source of power (not shown). As the fluid from the cone 7 passes into the line 11 and housing 13, the usual centrifugal action takes place therein, moving the fluid to the wall of the housing, and the light liquid, particularly the water, drains off through the line 16 and the heavy solids are thrown to the wall of the housing 13 and moved by the helical screw 12 through the forward end of the housing 13 and into the discharge line 21 and into the recovery tank 4 where the standard mud pump, as 18, may again pump the contents of the tank 4 into the supply line 19. The swirling action of the liquid in the cone 7 will carry the light solids and the liquid into the line 11 and into the housing 13. The light solids will flow into the housing 13 and drain off through the conduit 16 with the water, while the heavy solids will move to the walls of the housing 13 where they will be urged against the wall of the housing 13 by its rotation through suitable means such as the pulley 20 and will be moved into the discharge line 21 by the rotation of the screw 12. The continued entrance of fluid through the hub will urge the mass of heavy solids towards the discharge end and will cause the solids to build up until moved by the screw into the recovery tank.

The method of separation of solids taught herein consists of mixing a dilutent, such as water, with the solids of a mud to be separated and pumping same tangentially into a cone, removing large pieces of solids and a portion of the heavy solids from the fluid by gravity in the cone and completing the recovery by moving the residue into a centrifugal separator where the light solids and the liquids are separated from the heavy solids and the heavy solids moved into a storage tank for reuse. The storage tank 2 receives the mud to be separated directly from the well bore and the overflow of this tank will direct drilling mud from the tank 2 into the recovery tank 4 to maintain a constant supply of drilling mud for reuse. The process of separation is continuous, with only a portion of the drilling mud being processed and this process is accomplished by pumping the mud into the line leading into the cone, where it is mixed with water under pressure before being tangentially introduced into the cone for the primary separation of solids. The cone 7 produces a partial recovery of heavy solids, and the centrifugal separator, as represented by the housing 13 and screw 12, completes the recovery and frees the mud from undesirable solids, so that a maximum recovery of heavy solids is realized.

While the foregoing is considered a preferred form of the invention, it is by way of illustration only, the broad principle of the invention being defined by the appended claim.

What I claim is:

In a means mounted in a drilling mud supply system for separating heavy solids from a portion of said drilling mud, a storage tank, a cone and a centrifuge, means for draining the liquids from said storage tank into a recovery tank, a connecting line between said storage tank and said cone, means for pumping said solids from said storage tank into said line and means for pumping water into said line under pressure with said solids and to force said mixture into said cone tangentially adjacent the top thereof, a conduit leading from the top of said cone into said centrifuge and the bottom of said cone tapering terminating in a restricted conduit leading into said recovery tank to receive solids from said mixture, a rotatable helical screw in said centrifuge having a horizontal cone shaped housing, the enlarged end of said housing forming a chamber for receiving the water and light solids from said mixture and having drainage conduits leading therefrom, said screw and housing having means for rotation, moving the heavy solids towards the outer margins of said screw and against the inside wall of said cone shaped housing, and the rotation of the screw moving said heavy solids towards the small end of said housing and a discharge conduit at the small end of said housing leading into said recovery tank and means for moving said heavy solids into a supply line for maintaining a continuous flow of drilling mud.

References Cited in the file of this patent

UNITED STATES PATENTS

| | | |
|---|---|---|
| 1,710,315 | Laughlin | Apr. 23, 1929 |
| 2,054,058 | Laughlin | Sept. 8, 1936 |
| 2,156,333 | Cross et al. | May 2, 1939 |
| 2,225,973 | Brown et al. | Dec. 24, 1940 |
| 2,308,559 | Winkler | Jan. 19, 1943 |
| 2,381,760 | Latham | Aug. 7, 1945 |
| 2,504,944 | Atkinson | Apr. 18, 1950 |
| 2,596,616 | Strezynski | May 13, 1952 |
| 2,641,363 | Chatain | June 9, 1953 |
| 2,642,185 | Fontein | June 16, 1955 |
| 2,719,668 | Bergner | Oct. 4, 1955 |
| 2,738,070 | Cottrell | Mar. 13, 1956 |
| 2,754,968 | Vegter et al. | July 17, 1956 |
| 2,756,965 | Howe | July 31, 1956 |

FOREIGN PATENTS

| | | |
|---|---|---|
| 499,912 | Belgium | Dec. 30, 1950 |